Aug. 12, 1958 J. F. LILL ET AL 2,847,170
WINDING APPARATUS FOR DISTRIBUTED WOUND STATORS
Filed March 18, 1957 4 Sheets-Sheet 1

INVENTORS.
JOHN F. LILL &
ROBERT J. EMINGER
BY
Lockwood Galt Woodard & Smith
ATTORNEYS Aug. 12, 1958     J. F. LILL ET AL     2,847,170
WINDING APPARATUS FOR DISTRIBUTED WOUND STATORS
Filed March 18, 1957     4 Sheets-Sheet 2

INVENTORS.
JOHN F. LILL &
ROBERT J. EMINGER
BY
Lockwood Halt Woodard & Smith
ATTORNEYS Aug. 12, 1958 J. F. LILL ET AL 2,847,170
WINDING APPARATUS FOR DISTRIBUTED WOUND STATORS
Filed March 18, 1957 4 Sheets-Sheet 3

INVENTORS.
JOHN F. LILL &
ROBERT J. EMINGER
BY
Lockwood Galt Woodard & Smith
ATTORNEYS

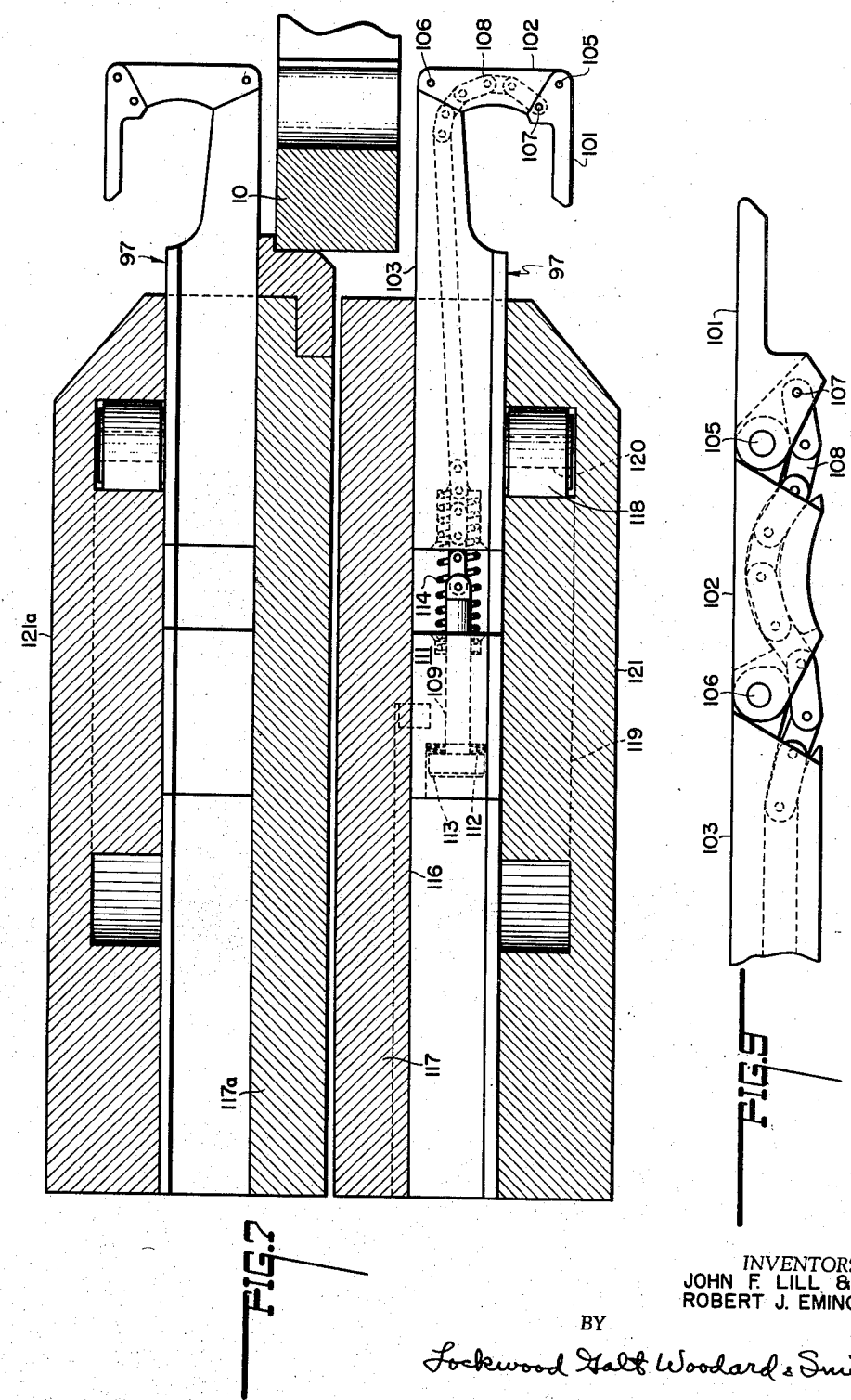

United States Patent Office 2,847,170
Patented Aug. 12, 1958

2,847,170

WINDING APPARATUS FOR DISTRIBUTED WOUND STATORS

John F. Lill, Fort Wayne, and Robert J. Eminger, Kendallville, Ind., assignors to Fort Wayne Tool, Die & Engineering Company, Fort Wayne, Ind., a company of Indiana Application March 18, 1957, Serial No. 646,653

10 Claims. (Cl. 242—1.1)

The present invention relates generally to stator winding apparatus and particularly to apparatus for winding stators having distributed pole windings.

In the winding of stators wherein the winding head must traverse a relatively wide arc to lay wire in slots which may be as much as 180° apart, it has, in the past, been difficult to assure that all of the turns are layed well back in the slot and that the wire extending between the slots is properly positioned so that the stator bore is clear of wire when the stator winding is completed. This problem is particularly present in the winding of distributed wound stators, where a wide arc of wire must be layed between slots, as compared to the relatively short winding path for salient pole stators.

Efforts to meet this problem in the past have included the addition of a coil forming operation on the wound stator in which fixtures are used to form the windings to assure that the stator bore is unobstructed. These additional forming operations on the wound stator, obviously add to the time required for, and consequently the cost of, the stator winding operation. Further, these forming operations on the wound stator increase the possibilities for damage to the wire or its insulation and consequently add to the number of stators which are found defective at final test.

The present invention provides an apparatus which assures that the stator windings are positioned well back in their slots and that the wire extending between even relatively widely spaced slots is arcuately formed well back from the stator bore to assure that at the completion of the winding operation the stator bore is clear of obstructing wire. The foregoing is accomplished without the use of additional wire forming operations on the wound stator, but by the use of a unique wire-guiding assembly which automatically positions the wire behind wire-receiving hooks which are mounted adjacent the stator, these hooks being articulated so that they may be automatically removed from association with the stator windings when the winding operation is completed.

A further object of the present invention is to provide wire receiving, articulated hooks coacting with an actuating assembly to permit automatic withdrawal of the hooks from the wound stator at the completion of the stator winding operation.

A further object of the present invention is to provide stator winding apparatus which is capable of winding distributed pole windings for multiple pole stators at relatively rapid speeds without requiring subsequent forming operations to give a stator bore clearing contour to the windings.

These and other objects will become apparent as the description proceeds with reference to the accompanying drawings in which:

Figure 7 is a side view of a portion of the apparatus shown in Figure 6.

Figure 9 is a detailed sectional view of one of the articulated, wire receiving fingers in open position.

Figures 1, 2, 3:
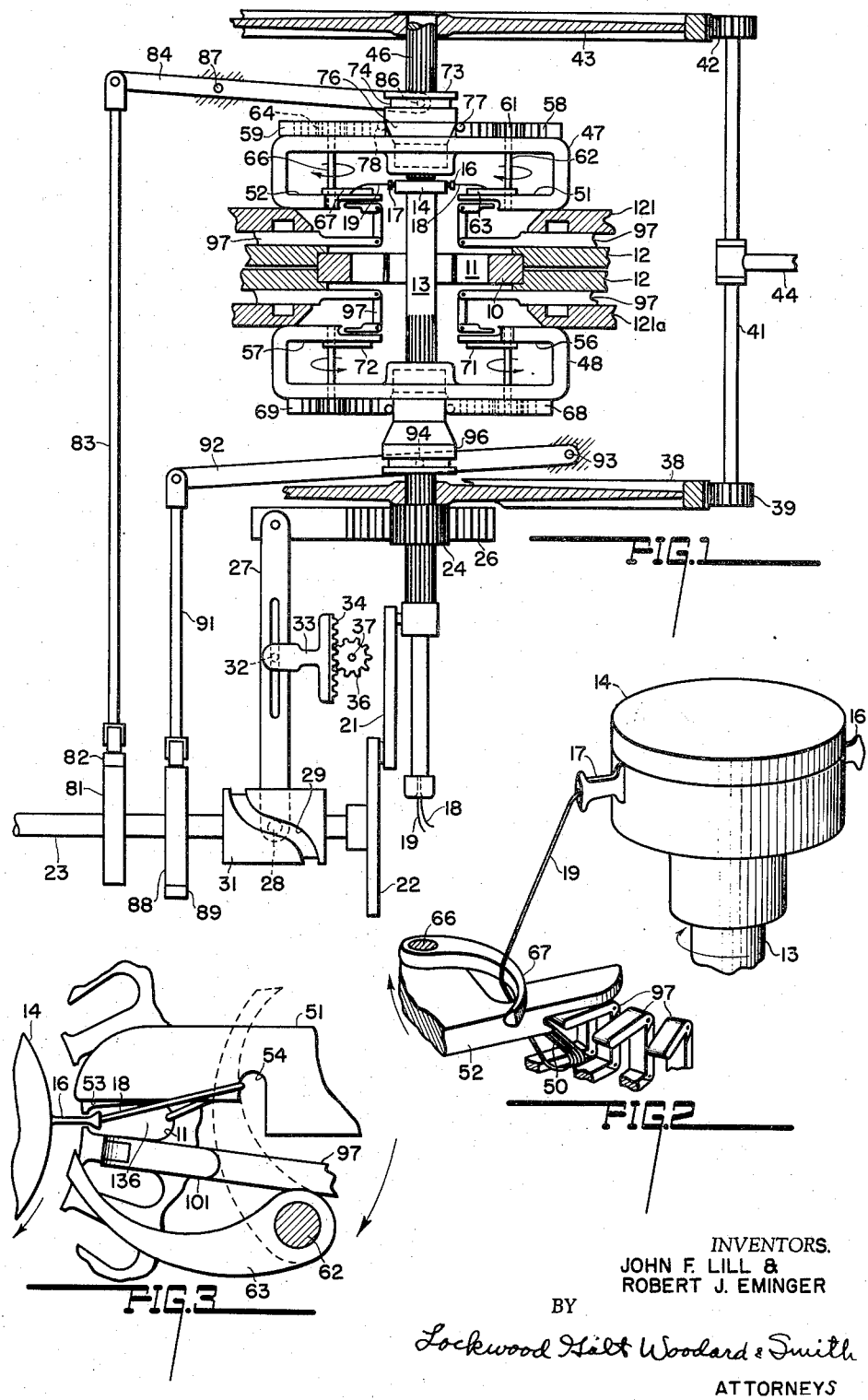
Figure 1 is a schematic showing of the wire guiding assembly together with an actuating apparatus which provides the required movement of the winding head and the wire guide assembly.
Figure 2 is a fragmentary, perspective view showing the winding head and the wire guide assembly.
Figure 3 is a top, fragmentary view of the apparatus shown in Figure 1.
Figure 5:
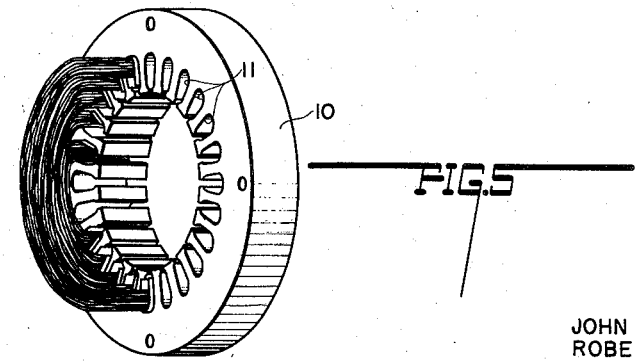
Figure 5 is a perspective view of a stator having a portion only of its windings completed.

Referring initially to Figures 1 and 5, there is shown at 10 a stator having a central bore and multiple spaced radially extending slots 11 adapted to receive windings, extending between certain of the slots 11. Figure 5 indicates the varying length which the groups of winding assume, this winding form being characteristic of stators having distributed windings. The stator 10, as may be seen in Figure 1 is mounted in stationary fashion by means of stator mounting members 12 shown in fragmentary form only since they form no part of the present invention. Extending through the central bore of the stator 10 is a hollow shaft 13 which at its upper end carries a winding head 14 which in turn mounts wire dispensing members 16 and 17. Shaft 13 is adapted to have threaded through its central, longitudinal bore two lengths of wire of 18 and 19 which are applied to the stator slots 11 by the winding head 14 in a manner to be subsequently described. It will be understood that the wires 18 and 19 are drawn from suitable wire supply reels (not shown) as the winding operation progresses.

Secured to the lower portion of the shaft 13 is a crank arm 21 having the conventional connection to a disc 22 which is mounted for rotation on a main drive shaft 23, which may be rotated by a conventional power means (not shown). The splined shaft 13 reciprocates through an internally splined gear 24 meshing with a co-operating rack 26. Pivotally mounted to an end of rack 26 is a link member 27 which at its lower end carries a cam follower roller 28 adapted to ride in the camming slot 29 of a conventional cylindrical cam 31. A moveable pivot 32 for the link 27 is provided by the pivot carrying member 33 which includes a toothed rack 34 which cooperates with a gear 36 mounted on a shaft 37.

Shaft 13 also provides rotation for an internally splined ring-gear 38 which, through a meshing gear 39, rotates a shaft 41. Shaft 41 through a second gear 42 drives a meshing ring gear 43 which is identical to gear 38. The shaft 41 is suitably journaled in a support 44 shown only fragmentarily in Figure 1. The gear 43 serves to rotate a splined shaft 46 which is the upper counter-part of the shaft 13. From the foregoing, it will be apparent that with rotation of shaft 23 the shaft 13 will be given a reciprocating motion and consequently the winding head 14 will be moved in a path parallel to the central axis of the bore of the stator 10. Further, at the limits of the reciprocating motion of winding head 14 referred to above, through cam 31 and rack 26, the shaft 13 will be given a rotational movement which consequently provides movement of the winding head 14 in a path transverse to the central axis of the bore of the stator 10. Through gear 38, shaft 41, and gear 43 the shaft 46 will be rotated in synchronism with the shaft 13, for a purpose to be subsequently explained. It will be further evident that the throw of the link 27 and consequently the amplitude of the rotational movement of shaft 13, shaft 46, and winding head 14 may be made to vary progressively by vertically displacing the pivot 32. This may be accomplished by rotation of gear 36 through its shaft 37 which may be rotated a predetermined amount at properly spaced intervals by a power means not shown and forming no part of the present invention.

Mounted on shafts 46 and 13, for rotation therewith, are generally C-shaped support members 47 and 48, respectively.

Shaft 13 has a suitably splined engagement with the central portion of support member 48 so that the vertically reciprocating movement given to shaft 13 by the crank 21 is not imparted to support member 38, it will be understood, however, that the rotational movement of shaft 13 and shaft 46, because of the splined connection, is imparted to support members 48 and 47, respectively.

The member 47 has inwardly extending ends which provide wire guiding members 51 and 52 which are, as may best be seen in Figure 3, formed with an indented margin 53 and a notch 54, forming a wire receiving abutment. Similarly the inwardly extending ends 56 and 57 of the member 48 (Figure 1) are each formed with the indented margin and notch just described with reference to Figure 3. Support member 47 also carries for movement thereon racks 58 and 59. Rack 58 is adapted to be engaged with a gear 61 which turns a shaft 62 journaled in the member 47. The shaft 62 carries an inwardly extending wire pick-off member or finger 63 which, as may best be seen in Figure 3, is positioned adjacent to the wire guiding member 51 and is pivotally moved by the shaft 62 into engagement with the wire 18 and into overlying relation with the wire guiding member 51. The rack 59 has engagement with a gear 64 which by means of a shaft 66 pivotally moves the inwardly extending finger 67, formed identically to the finger 63.

Support member 48 carries racks 68 and 69 which, identically with the apparatus just previously described, have driving engagement with pick-off fingers 71 and 72, these being formed identically to the fingers 63 and 67 previously described.

The means for actuating the pick-off fingers 63, 67, 71, and 72 at the proper time in the winding cycle comprises in the case of fingers 63 and 67 a camming member 73 having circumferential slot 74 and a circumferential inclined cam surface 76 which is adapted to be engaged by appropriate cam followers 77 and 78 carried by the racks 58 and 59 respectively. The member 73 has a lower portion of somewhat reduced diameter which has a sliding fit within an accommodating opening in the central portion of the support member 47. The central opening through the member 73 freely accommodates the shaft 46 so as to permit vertical movement of the member 73 upon the shaft 46. This vertical motion is provided by a cam 81, mounted on the shaft 23 and having a single lobe 82, which through an appropriate cam follower provides a vertical motion impulse to a link member 83 with each revolution of the cam 81. The upper end of member 83 has a pivotal connection to a member 84 and intermediate its ends is pivotally mounted at 87. The other end of member 84 carries a cam roller 86 which cooperates with the slot 74 in the member 73. From the foregoing it will be evident that each motion impulse given to the member 84 will result in vertical movement of the member 73 which, in turn, by means of racks 58 and 59 will impart a pivotal movement to the fingers 63 and 67. Thus as the member 73 is moved downwardly, as may best be seen in Figure 1, the finger 63 will be given a sharp clockwise rotational impulse carrying it to its broken line position of Figure 3. Similarly, as may best be seen in Figure 1, downward movement of the member 73 because of the corresponding displacement of rack 59 causes the finger 67 to move sharply into its position of Figure 2. Since the lobe 82 on the cam 81 is relatively short in circumferential length it will be understood that the downward movement of the member 73 is of brief duration and that the finger 63 is consequently only momentarily held in its broken line position of Figure 3 and is thereafter returned to its solid line position of Figure 3 as the cam lobe 82 rides from beneath its cam follower.

A cam 88 similar to the cam 81 has a lobe 89 adapted to cooperate with a cam follower carried by a link member 91. A member 92, pivotally mounted at 93, has a pivotal connection at its free end with the member 91. A cam follower roller 94 cooperates with a vertically moveable camming member 96 which is in all respects identical to the previously described camming member 73. As previously mentioned with regard to camming member 73, the member 96 has a portion of somewhat reduced diameter which slideably fits an accommodating opening in the central portion of the member 48 and has a central opening which freely accommodates the shaft 13, this arrangement permitting vertical motion of the camming member 96 which is independent of the vertical motion of the shaft 13. It will be noted that the lobe 89 on the cam 88 is positioned 180° from the lobe 82 on the cam 81 and also from the connection of the crank 21 with the member 22. It will therefore be apparent that when the winding head 14 is adjacent its lowermost vertical position, the cam 88 will give the member 96 an upward motion pulse which, in turn, will pivotally move the fingers 71 and 72 in the directions indicated in Figure 1.

Shown fragmentarily in Figure 1 are wire receiving members 97 which are positioned adjacent to the stator 11. The mounting means and the construction of the members 97 may best be described with reference to Figures 6, 7, 8, and 9. As is evident from Figure 7, the members 97 (only one of which is shown in detail) have a hooked configuration formed by the components parts 101, 102, and 103 which are pivotally interconnected at 105 and 106. A central slot in the base portion of the part 101 provides an anchor mounting 107 for a linked chain 108. The chain 108 extends slidably through a central rectangular passage in the parts 102 and 103 and at its opposite end is connected to the end of a pin 109 which extends through a rectangular block 111 and has spring washers 112 separating its head 113 from the end of the block 111. A compression spring 114 extends between appropriate seating surfaces formed in the ends of part 103 and block 111. It will be apparent that the chain or flexible member 108 is held in tension by the spring 114, and when so held establishes the hooked configuration for the member 97. As may best be understood with reference to both Figures 7 and 9, when a force is applied to the parts 101 and 102 in a direction which tends to unfold or relax the hooked configuration, the member 97 will assume the linear configuration of Figure 9, this movement being made possible by the displacement of block cam 88 will give the member 96 an upward motion pulse which, in turn, will pivotally move the fingers 71 and 72 in the directions indicated in Figure 1.

Shown fragmentarily in Figure 1 are wire receiving members 97 which are positioned adjacent to the stator 11. The mounting means and the construction of the members 97 may best be described with reference to Figures 6, 7, 8, and 9. As is evident from Figure 7, the members 97 (only one of which is shown in detail) have a hooked configuration formed by the component parts 101, 102, and 103 which are pivotally interconnected at 105 and 106. A central slot in the base portion of the part 101 provides an anchor mounting 107 for a linked chain 108. The chain 108 extends slidably through a central rectangular passage in the parts 102 and 103 and at its opposite end is connected to the end of a pin 109 which extends through a rectangular block 111 and has spring washers 112 separating its head 113 from the end of the block 111. A compression spring 114 extends between appropriate seating surfaces formed in the ends of part 103 and block 111. It will be apparent that the chain or flexible member 108 is held in tension by the spring 114, and when so held establishes the hooked configuration for the member 97. As may best be understood with reference to both Figures 7 and 9, when a force is applied to the parts 101 and 102 in a direction which tends to unfold or relax the hooked configuration, the member 97 will assume the linear configuration of Figure 9, this movement being made possible by the displacement of block 111 closer to the part 103 with an accompanying additional stressing of the spring 114. It will be understood that by varying the initial compressive stress to which the spring 114 is subjected the force required to unfold the member 97 may like-wise be varied.

Figure 6:
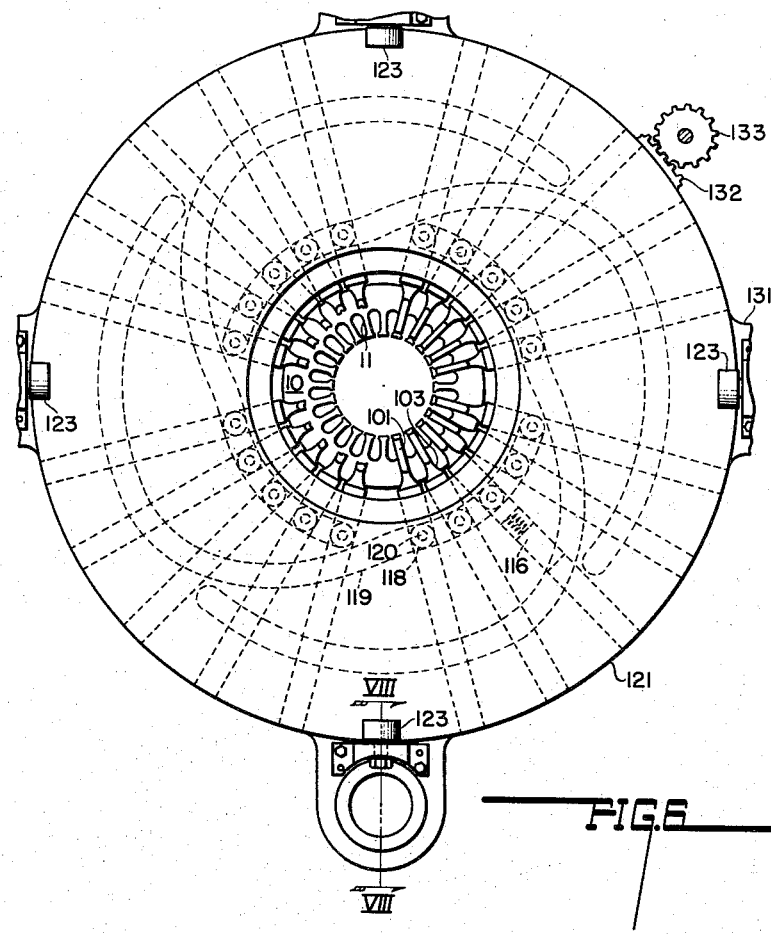
Figure 6 is a top view of the actuating apparatus for the articulated, wire receiving fingers.
Figure 8:
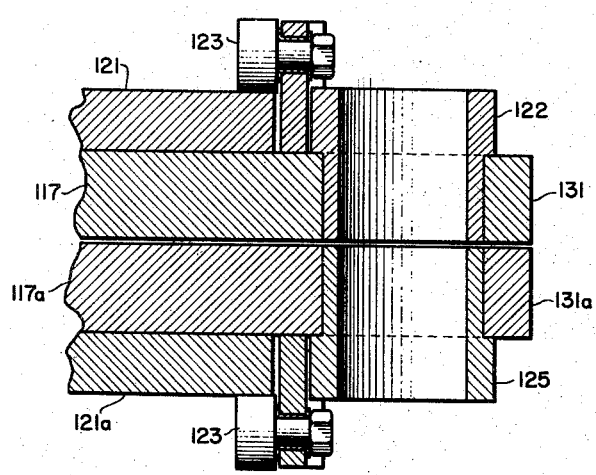
Figure 8 is a sectional view taken along the line A—A of Figure 6.

As may best be seen in Figure 6, each of the members 97 and its accompanying block 111 are positioned in radially extending slots 116 in a plate 117 (Figure 7) and each of the members 97 have extending centrally therefrom a roller 118 which is mounted for rotation on a suitable stub shaft 120 carried by each of members 97. The rollers 118, as may best be seen in Figures 6 and 7, are received within grooves 119 having a somewhat involute form in a circular plate 121. As may be seen in Figures 1, 6, and 7, the plates 121 and 117 overlie the stator 10 as it is held in position by the members 12 (Figure 1), and, it will be understood, duplicate lower plates 117a and 121a underlie the stator 11 when it is mounted for winding. Suitable support members 122 and 125 (Figure 8) support circumferential bearing rollers 123 which position the grooved plates 121 and 121a but permit rotational movement thereof. The plates 117 and 117a have extending portions 131 and 131a which are rigidly secured to the support members 122 and 125 respectively. A geared sector 132 secured to the grooved plate 121, shown fragmentarily in Figure 6, which meshes with a pinion gear 133 illustrates one form which the rotational drive for the camming plate 121 may take. It will be understood that a similar gear sector is provided for the roller camming plate 121a; this sector being driven by a gear (not shown) similar to gear 133. These gears 133 may be driven from a suitable source of rotational drive which may be actuated by any suitable means (not shown) at the end of the stator winding operation.

*Operation*

Figure 4:
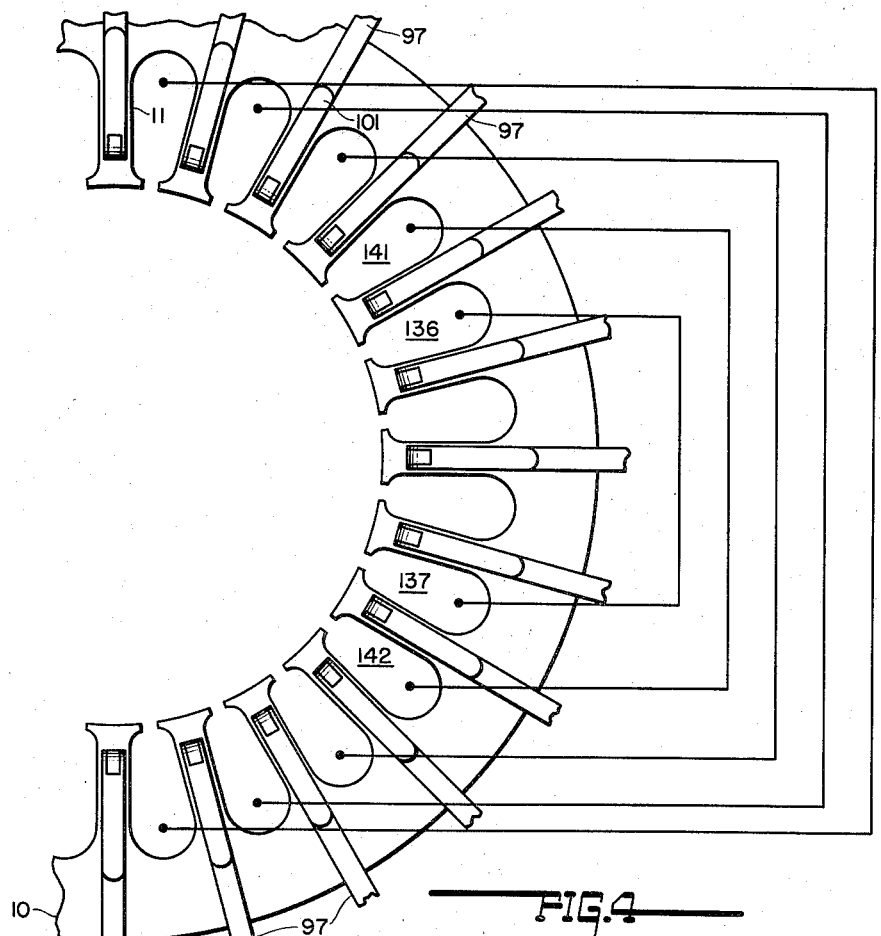
Figure 4 is a top view of a stator with the wire receiving hooks in place and with the locus of the wound wire indicated.

With the stator mounting members 12 (Figure 1) in position to support the stator 10 for winding, and with the members 97 in position as shown in Figures 1 and 4, the free ends of the wires 18 and 19 dispensed from the winding head 14 may be anchored in any suitable fashion and the winding operation may then be initiated. Since initially the shortest coil is to be wound upon the stator 10, a comparison of Figures 1 and 4 will indicate that vertical motion of the winding head 14 upward toward its position of Figure 1 will carry wire 18 up through the slot 136; subsequent movement of the winding head horizontally, or transverse to the axis of the stator bore, will carry the wire (as may be seen in Figure 4) to the stator slot 137, whereupon the downward movement of the winding head 14 will carry the wire through the stator slot 137. Thereafter the winding turn will be completed by the horizontal motion of the winding head in carrying the wire back across the underside of the stator 10 to the slot 136. Subsequent vertical movement of the winding head 14 will carry the wire up through the slot 136 and the depositing of windings between the slots 136 and 137 will continue until the desired number of turns are so placed, whereupon the throw or magnitude of the horizontal motion of the winding head will be changed to cause the winding head to, in turn, deposit a winding between the next pair of stator slots 141 and 142 (Figure 4). This change in the throw of the winding head may be made by any suitable means but, as schematically shown in Figure 1, is accomplished by moving the pivot point 32 of the member 27 downwardly so that the motion imparted to rack 26 is increased thereby increasing the span of the rotary motion of the shaft 13 and winding head 14. The required intermittent controlled movement of the pivot 32 may be accomplished by driving the gear 36 from a power means which is controlled by a suitable indexing or counting mechanism (not shown) which would assure that the horizontal motion of the winding head 14 is sequentially altered in magnitude to accommodate successive spaced stator slots. It will be understood that, as may best be seen in Figure 1, the winding head 14 simultaneously winds both sides of the stator 10, wire 19 being deposited in the appropriate stator slots as the wire 18 is similarly positioned in the stator slots referred to above.

The action of the wire guiding and positioning assembly, including the articulated members 97 which embody the present invention will now be described. The operation of this assembly will be particularly described with reference to the wire receiving member 51, finger 63 and wire 18, all of which are shown in the upper right hand sector of Figure 1, it being understood that this assembly (shown in detail in Figure 3) serves to typify the operation of the wire guiding member 52 and finger 67 (shown perspectively in detail in Figure 2) and also the operation of wire guiding members 56 and 57 together with pick-off fingers 71 and 72. If it is assumed that in Figure 1, the winding head 14 is just completing its upward movement, bringing the wire 18 up through stator slot 136 (Figure 4), then the downward motion given the member 73 by the cam 81 will cause the rack 58 to rotate shaft 62 clockwise as viewed in Figure 3. As will be clear from Figure 3, the resulting sharp pivotal movement of the member 63 into its broken line position will cause the finger 63 to enage the wire 18 drawing it back into alignment with the wire engaging abutment or slot 54 in the member 51. It will be understood that pivotal movement of member 63 begins as wire dispensing member 16 clears the appropriate stator slot so that as the wire dispensing member 16 moves upwardly past the member 51 the wire will be picked up by the member 63 and moved into slot 54. As this movement of finger 63 to its broken line position of Figure 3 is completed, the rotational progress of cam 31 (Figure 1) will be such that shaft 13 and shaft 46 will be rotated in a direction which, through the consequent rotation of member 47, moves the member 51 in a generally clockwise direction as indicated in Figure 3. This clockwise movement is, of course, accompanied by a similar clockwise rotation of the winding head 14, it being understood that the arcuate path of movement of the member 51 parallels the arcuate path of movement of the winding head and the wire dispensing member 16. As this movement of the member 51 proceeds, the wire 18 will be picked up by the notch 54 as shown in Figure 3, and because the rotational progress of the cam 81 (Figure 1) removes the lobe 82 from under its cam follower, the member 84 will return the camming member 73 to its uppermost position, resulting in counter rotation of the shaft 62 and consequent movement of finger 63 back to its solid line position of Figure 3 out of the way of wire 18 and member 16 so that wire dispensing member 16 clears finger 63 on its subsequent downward stroke. As the member 51 proceeds through its motion between the stator slots, it will be evident that the wire 18 will be deposited beneath the portions 101 of the articulated wire receiving members 97 and will be received within the hooked configuration thereof. When the winding head 14 and the member 51 have rotated sufficiently so that the member 51 overlies the stator slot 137 (Figure 4), the rotational progress of disc 22 will be such that the crank 21 will give the shaft 13 and, consequently the winding head 14, a downward motion slipping the wire 18 out of the notch 54 and carrying it downwardly through the slot 137. From Figure 1 it will be apparent that as previously pointed out, this same sequence of movement of the wire guiding assembly occurs when the winding head is rotated while in its lower most position, the fingers 71 and 72 and the wire guiding members 56 and 57 performing the same function as the finger 63 and the wire guide 51 described with reference to Figure 3.

When the desired number of turns have been placed between the slots 136 and 137 (the position of the turns as they accumulate on the members 97 being illustrated at 50 in Figure 2), the throw of the link 27 may be automatically widened by lowering the pivot point 32 (Figure 1) through the indexing, by any suitable means, of the gear 36. This widening of the horizontal arc through which the winding head moves the wire dispensing member 16 will cause the winding head to deposit the wire between the slots 141 and 142. Since the support member 47 turns with the shaft 13 it will be understood that the widening of the horizontal path of movement of the winding head 14 will be accompanied by a corresponding widening of the horizontal path of movement of the member 51. After the desired number of turns have been deposited between slots 141 and 142 (Figure 4), the draw of the winding head may again automatically widen to accomplish the winding of turns between the next further spaced pair of stator slots.

When the stator is completely wound as shown in Figure 5 (one-half of the windings here having been omitted, however, for clarity), before removal of the wound stator the wire receiving members 97 must be withdrawn from their position between the windings and the stator 10. The action of the apparatus for accomplishing this withdrawal will now be described. At the completion of the winding operation the camming plates 121 and 121a (Figure 6) will be rotated counterclockwise, as viewed in Figure 6, by means of rotation of the pinion gear 133, such rotation being brought about by a suitable drive means (not shown) which may be either automatically or manually controlled. This counterclockwise rotation of plate 121 will result in camming rollers 118 traversing the length of the camming slots 119. From the shape of the slots 119 it will be evident that as the plate 121 rotates, the members 97 must move radially outwardly through the radial slots 116. As this radially outward motion of the members 97 proceeds, the accumulated turns of wire within the hooked configuration of the members 97 will cause the portions 101 and 102 to assume their position of Figure 9, compressing spring 114 (Figure 7) and causing the member 97 to assume the linear configuration illustrated in Figure 9. With such a configuration, it will be evident that as the plate 121 rotates counterclockwise, the members 97 will be completely withdrawn from their positions between the stator and the windings placed thereon. It will be understood that while only movement of plate 121 has been referred to in detail above, movement of plate 121a will similarly withdraw from the stator its associated wire receiving members 97 in similar fashion. After the members 97 have been withdrawn the stator clamping means 12 may be suitably manipulated to permit removal of the wound stator from the winding apparatus. As previously mentioned the mechanism for operation of the stator clamping means 12 is not herein disclosed in detail since it forms no part of the present invention.

The foregoing makes apparent that the present invention provides a wire guiding assembly which rotates with the winding head positioning the wire well back in the stator slots and provides the wire with a stator bore clearing contour as the wire is wound between the proper stator slots. This assembly, which includes the pick-off fingers and wire guiding members, includes also the articulated wire receiving members 97 which, because of their articulated form and mounting may be easily removed from association with the stator after the winding thereof, is completed and may similarly be readily reestablished in the stator winding position.

The foregoing has described a preferred embodiment of the invention, modifications may occur to those skilled in the art and it is to be understood that the scope of the present invention is to be limited only by the appended claims.

We claim:

1. In a stator winding apparatus of the type in which a winding head moves relative to a slotted stator in a path sequentially parallel to and transverse to the axis of the stator bore in placing a winding between two angularly separated stator slots: a wire guiding means comprising wire-receiving members mounted in radially extending position adjacent the stator slots, a wire guiding member adapted to be moved in a path paralleling the transverse path of movement of the winding head and in synchonism therewith as it moves between the stator slots, wire pick-off means for releasably securing the wire dispensed from the winding head to said wire guiding member, said wire guiding member positioning the wire on said wire-receiving members as it moves through its said transverse path.

2. In a stator winding apparatus of the type in which a winding head moves relative to a slotted stator in a path sequentially parallel to and transverse to the axis of the stator bore in placing a winding between two angularly separated stator slots: a wire guiding means comprising articulated wire-receiving members having a closed position in which said members have a hook-like configuration and an open position in which said members have a linear configuration, means for mounting said wire-receiving members in radially extending position adjacent the stator slots, a wire-guiding member adapted to be moved in a path paralleling the transverse path of movement of the winding head and in synchronism therewith as it moves between the stator slots means for releasably securing the wire dispensed from the winding head to said wire guiding member, said wire guiding member positioning the wire on said wire-receiving members as it moves through its said transverse path, and a cam member adapted to coact with said wire receiving members to simultaneously move them from their said closed to open positions and to radially withdraw them from their positions adjacent the stator slots at the completion of the winding operation.

3. In a stator winding apparatus of the type in which a winding head moves relative to a slotted stator in a path sequentially parallel to and transverse to the axis of the stator bore in placing a winding between two angularly separated stator slots: a wire guiding means comprising articulated wire-receiving members having a closed position in which said members have a hook-like configuration and an open position in which said members have a linear configuration, means for mounting said wire-receiving members in radially extending position adjacent the stator slots, a wire-guiding member adapted to be moved in a path paralleling the transverse path of movement of the winding head and in synchronism therewith as it moves between the stator slots, means for releasably securing the wire dispensed from the winding head to said wire guiding member, said wire guiding member positioning the wire on said wire-receiving members as it moves through its said transverse path, and a rotatable cam member having a grooved inner face overlying said wire receiving members and cooperable therewith to simultaneously move them from their said closed to open positions and to radially withdraw them from their positions adjacent the stator slots as said cam member is rotated at the completion of the winding operation.

4. In a stator winding apparatus of the type in which a winding head moves relative to a slotted stator in a path sequentially parallel to and transverse to the axis of the stator bore in placing a winding between two angularly separated stator slots: a wire guiding means comprising wire-receiving members mounted in radially extending position adjacent the stator slots, a wire guiding member adapted to be moved in a path paralleling the transverse path of movement of the winding head and in synchronism therewith as it moves between the stator slots, wire pick-off means for releasably securing the wire dispensed from the winding head to said wire guiding member, said wire guiding member positioning the wire on said wire-receiving members as it moves through its said transverse path, said pick-off means comprising a moveable member actuated in each cycle of the winding head near the start of the transverse movement thereof to engage the wire extending from the winding head and move it into secured position relative to said wire guiding member.

5. In a stator winding apparatus of the type in which a winding head moves relative to a slotted stator in a path sequentially parallel to and transverse to the axis of the stator bore in placing a winding between two angularly separated stator slots: a wire guiding means comprising wire-receiving members mounted in radially extending position adjacent the stator slots, a wire guiding member overlying said wire receiving members having a wire-engaging abutment therein and adapted to be moved in a path paralleling the transverse path of movement of the winding head and in synchronism therewith as it moves between the stator slots, wire pick-off means for releasably securing the wire dispensed from the winding head to said wire guiding member, said wire guiding member positioning the wire on said wire-receiving members as it moves through its transverse path, said pick-off means comprising a pivotally moveable finger actuated in each cycle of the winding head near the start of the transverse movement thereof to engage the wire extending from the winding head and position it against said wire-engaging abutment in the wire guiding member.

6 In a stator winding apparatus of the type in which a winding head moves relative to a slotted stator in a path sequentially parallel to and transverse to the axis of the stator bore in placing a winding between two angularly separated stator slots: a wire guiding means comprising articulated wire-receiving members having a closed position in which said members have a hook-like configuration and an open position in which said members have a linear configuration, means for mounting said wire-receiving members in radially extending position adjacent the stator slots, a wire-guiding member adapted to be moved in a path paralleling the transverse path of movement of the winding head and in synchronism therewith as it moves between the stator slots, pick-off means for releasably securing the wire dispensed from the winding head to said wire guiding member, said wire guiding member positioning the wire on said wire-receiving members as it moves through its said transverse path, and a cam member adapted to coact with said wire receiving members to simultaneously move them from their said closed to open positions and to radially withdraw them from their positions adjacent the stator slots at the completion of the winding operation, said pick-off means comprising a moveable member actuated in each cycle of the winding head near the start of the transverse movement thereof to engage the wire extending from the winding head and move it into secured position relative to said wire guiding member.

7. In a stator winding apparatus of the type in which a winding head moves relative to a slotted stator in a path sequentially parallel to and transverse to the axis of the stator bore in placing a winding between two angularly separated stator slots: a wire guiding means comprising articulated wire-receiving members having a closed position in which said members have a hook-like configuration and an open position in which said members have a linear configuration, means for mounting said wire-receiving members in radially extending position adjacent the stator slots, a wire guiding member overlying said wire receiving members having a wire-engaging abutment therein and adapted to be moved in a path paralleling the transverse path of movement of the winding head and in synchronism therewith as it moves between the stator slots, wire pick-off means for releasably securing the wire dispensed from the winding head to said wire guiding member, said wire guiding member positioning the wire on said wire receiving members as it moves through its said transverse path, and a rotatable cam member having a grooved inner face overlying said wire receiving members and cooperable therewith to simultaneously move them from their said closed to open positions and to radially withdraw them from their positions adjacent the stator slots as said cam member is rotated at the completion of the winding operation, said pick-off means comprising a pivotally moveable finger actuated in each cycle of the winding head near the start of the transverse movement thereof to engage the wire extending from the winding head and position it against said wire-engaging abutment in the wire guiding member.

8. Apparatus for forming the wire deposited by a winding head between angularly separated stator slots comprising articulated wire receiving members mounted adjacent said slots, said members each having a flexible member extending therethrough and adapted to releasably hold the wire receiving member in wire forming position, and resilient means for holding said flexible member under tension but yieldable to permit movement of said wire receiving member into wire releasing position.

9. Apparatus for forming the wire deposited by a winding head between angularly separated stator slots comprising wire receiving members jointed to provide a hooked configuration and mounted in spaced relation between said slots, said members each having a linked chain extending centrally therethrough and adapted to releasably hold the wire retaining member in hooked configuration, and resilient means for holding said chain in tension but yieldable to permit said wire retaining member to assume a linear configuration.

10. A wire receiving member adapted to cooperate with a stator winding head to provide a stator bore clearing contour for the wire deposited by the winding head, said member being jointed to provide a hooked configuration and mounted adjacent the winding head, a linked chain extending centrally through said member and adapted to releasably hold it in hooked configuration but yieldable to permit said wire retaining member to assume a linear configuration.

References Cited in the file of this patent

UNITED STATES PATENTS

| | | |
|---|---|---|
| 889,699 | Lipscomb | June 2, 1908 |
| 1,977,828 | Laib et al. | Oct. 23, 1934 |
| 2,197,117 | Ammann et al. | Apr. 16, 1940 |
| 2,624,518 | Schofield et al. | Jan. 6, 1953 |
| 2,770,424 | Grove | Nov. 13, 1956 |